Figure 1:
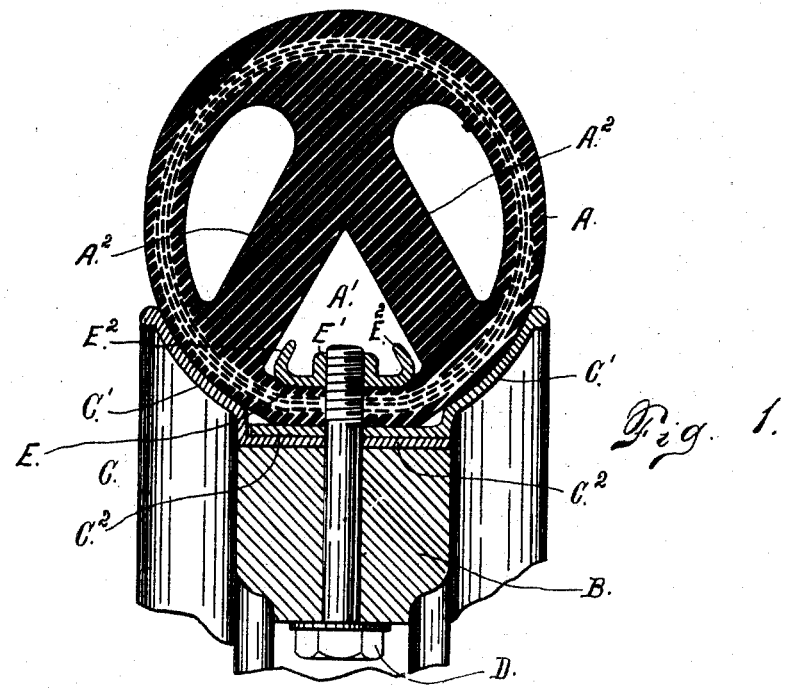

No. 776,047. PATENTED NOV. 29, 1904.
C. G. FAWKES.
TIRE RIM.
APPLICATION FILED JAN. 15, 1904.
NO MODEL.

Witnesses
Otto E. Hoddick.
Dena Nelson.

C. G. Fawkes,
Inventor

No. 776,047.

Patented November 29, 1904.

UNITED STATES PATENT OFFICE.

CHARLES G. FAWKES, OF DENVER, COLORADO.

TIRE-RIM.

SPECIFICATION forming part of Letters Patent No. 776,047, dated November 29, 1904.

Application filed January 15, 1904. Serial No. 189,214. (No model.)

*To all whom it may concern:*

Be it known that I, CHARLES G. FAWKES, a citizen of the United States of America, residing in the city and county of Denver and State of Colorado, have invented certain new and useful Improvements in Tire-Rims and Fastening Means; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in tire-rims and means for fastening the same in place on the tires, and is more especially intended for use with large tires, such as are used on wheels of automobiles or horseless vehicles.

My object is to provide a rim in combination with fastening means therefor which shall obviate the difficulty heretofore experienced in applying a large rubber tire to a rim, by reason of the fact that the tire must be stretched over the outer edge of the rim on one side, which in the case of tires of considerable cross-sectional area is of considerable height, making the operation quite difficult.

The rim herein shown consists of two members, one of which is permanently secured to the felly of the wheel until the tire is placed in position, after which the other member is applied, thus obviating the aforesaid difficulty.

In the drawings hereto attached and forming a part of this specification I have shown the construction of tire protected by Letters Patent of the United States No. 682,977, issued to me September 17, 1901; but it must be understood that my improved rim may be applied to tires of other construction.

Having briefly outlined my improved construction, I will proceed to describe the same in detail, reference being made to the accompanying drawings, in which is illustrated an embodiment thereof.

Figure 2:
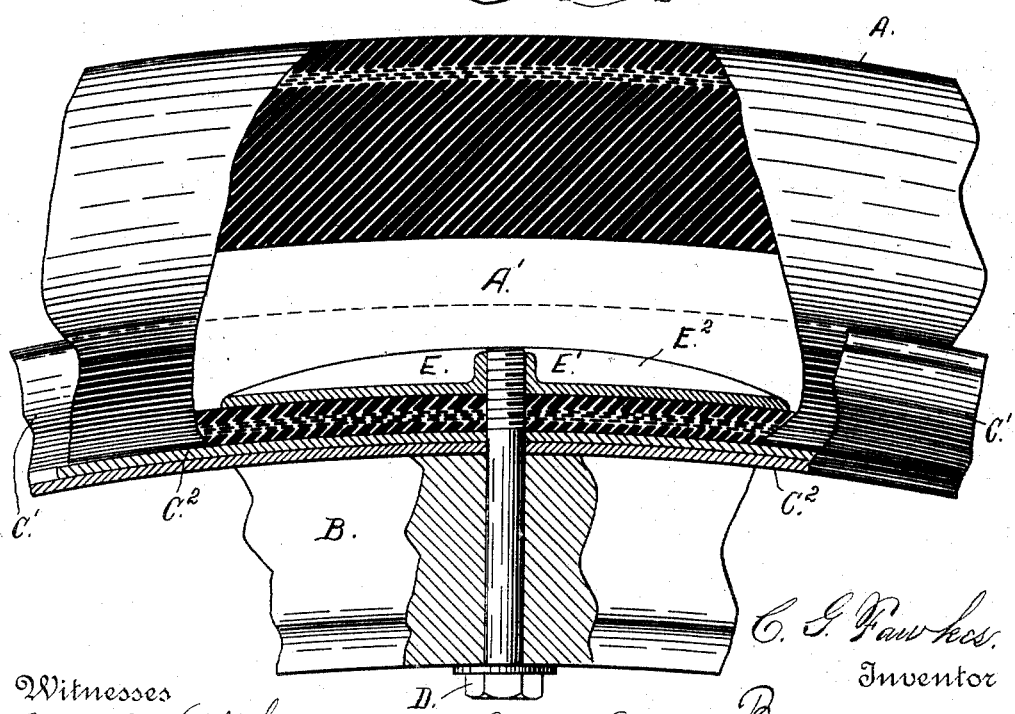

In the drawings, Figure 1 is a cross-section taken through a tire and felly shown in connection with my improved wheel-rim construction. Fig. 2 is a fragmentary longitudinal section of the same.

The same reference characters indicate the same parts in both views.

Let A designate the tire, which, as shown in the drawings, is provided with a core having a V-shaped opening $A'$ located adjacent its inner periphery and having inclined wings $A^2$ on opposite sides of the opening $A'$. The felly B of the wheel may be of any desired construction. It is assumed that this felly is of wood. To this felly is applied the rim C, composed of two members $C'$, having overlapping parts $C^2$. One of these parts $C^2$ is applied directly to the outer periphery of the felly B, while the other part $C^2$ is located outside of the part engaging the felly, but in engagement therewith. As shown in the drawings, the rim is secured to the felly by bolts D, which pass through registering openings formed in the felly and in the overlapping parts $C^2$ of the rim, and in the special construction of tire shown this bolt passes through the inner periphery of the tire and protrudes into the cavity $A'$ and enters a threaded opening formed in a shoe E, located in the cavity $A'$ and centrally reinforced, as shown at $E'$, to form a threaded opening of sufficient depth to give the bolt the required holding capacity. As shown in the drawings, this shoe is provided with flanges $E^2$, formed on its opposite longitudinal edges. Its width is such as to give a good bearing-surface on the inside of the tire, whereby the tires are very securely held in place upon the rim or felly equipped with my improved duplex-rim construction.

When the special form of fastening means shown in the drawings is employed, the shoes E are inserted by the use of a suitable tool (not shown) through the bolt-hole in the tire, the material of the tire yielding sufficiently to permit this. Before placing the tire in position one member $C'$ of the rim is placed in position and secured to the felly of the wheel. The tire is then put in position, after which the other member $C'$ is forced into place on the opposite side of the felly, its part $C^2$ being forced between the inner periphery of the tire and the outer surface of the overlapping part $C^2$ of the other member, which has been permanently secured to the felly, as aforesaid. The bolt D is then placed in position and screwed into the threaded part of the shoe, the latter having already been put in place, as heretofore explained.

It will be understood that any desired number of bolts D and a corresponding number of fastening-shoes E may be employed. Only one bolt D and one shoe are shown, since the shoes and bolts are all alike, and one of each being shown clearly illustrates the fastening means herein disclosed for use in connection with my improved duplex rim.

It must be understood that the invention is adapted for use with wheels having wire spokes as well as for wheels having fellies, as shown in the drawings.

Having thus described my invention, what I claim is—

1. The combination with a cushion-tire having a cavity, of a shoe located in said cavity, a duplex rim having engaging interlocking parts located adjacent the inner periphery of the tire, and a fastening device having a threaded connection with the shoe and passing through the interlocking rim members as well as the inner periphery of the tire.

2. The combination with a cushion-tire having a cavity, of a shoe located in said cavity, a duplex rim composed of substantially twin members having overlapping parts, and a fastening device having a threaded connection with the shoe and passing through the overlapping rim members as well as the inner periphery of the tire.

3. The combination with a felly, and a cushion-tire having a cavity adjacent its inner periphery, of a shoe located in said cavity and having a threaded opening, a duplex rim composed of substantially twin members having overlapping parts interposed between the outer periphery of the felly and the inner periphery of the tire, and a bolt passing through the felly, the overlapping tire members as well as the inner periphery of the tire, the inner extremity of the bolt being threaded in the opening of the shoe.

In testimony whereof I affix my signature in presence of two witnesses.

CHARLES G. FAWKES.

Witnesses:
 DENA NELSON,
 IDA E. O'BRIEN.